United States Patent
Lesley

(10) Patent No.: US 8,234,757 B2
(45) Date of Patent: Aug. 7, 2012

(54) SECURITY STRAP

(75) Inventor: Kevin E. Lesley, Beaverton, OR (US)

(73) Assignee: Yakima Products, Inc., Beaverton, OR (US)

( * ) Notice: Subject to any disclaimer, the term of this patent is extended or adjusted under 35 U.S.C. 154(b) by 159 days.

(21) Appl. No.: 12/493,106

(22) Filed: Jun. 26, 2009

(65) Prior Publication Data

US 2010/0043186 A1    Feb. 25, 2010

Related U.S. Application Data

(60) Provisional application No. 61/133,441, filed on Jun. 26, 2008.

(51) Int. Cl.
*B60P 7/08* (2006.01)
*B60P 7/06* (2006.01)
*E05B 73/00* (2006.01)

(52) U.S. Cl. ................ 24/68 CD; 70/58; 70/18; 24/170

(58) Field of Classification Search ............... 24/132 R, 24/133, 134 R, 134 L, 132 AA, 134 KA, 24/122.6, 68 CD, 170; 70/14, 18, 30, 49, 70/58, 233, 50.1, 258, 164

See application file for complete search history.

(56) References Cited

U.S. PATENT DOCUMENTS

| | | | |
|---|---|---|---|
| 913,469 A * | 2/1909 | Cleaveland | 24/134 KB |
| 2,513,169 A * | 6/1950 | Griswold | 24/170 |
| 2,916,786 A * | 12/1959 | Legat | 24/170 |
| 3,703,024 A * | 11/1972 | Johnson | 24/68 CD |
| 3,875,771 A * | 4/1975 | Reisner | 70/18 |
| 3,879,810 A * | 4/1975 | Prete et al. | 24/194 |
| 3,987,653 A * | 10/1976 | Lyon et al. | 70/19 |
| 4,547,980 A * | 10/1985 | Olivieri | 36/50.5 |
| 4,685,315 A | 8/1987 | Comolli | |
| 5,423,644 A * | 6/1995 | First, Sr. | 410/100 |
| 6,164,507 A * | 12/2000 | Dean et al. | 224/324 |
| 6,199,412 B1 * | 3/2001 | Kennedy | 70/18 |
| 6,385,822 B1 * | 5/2002 | Dean et al. | 24/633 |
| 6,431,423 B1 * | 8/2002 | Allen et al. | 224/509 |
| 6,470,718 B1 * | 10/2002 | Yang | 70/30 |
| 6,510,717 B1 * | 1/2003 | Levi | 70/18 |
| 6,543,096 B2 * | 4/2003 | Settelmayer et al. | 24/170 |
| 6,561,398 B1 * | 5/2003 | Cole et al. | 224/324 |
| 6,684,667 B2 * | 2/2004 | Young | 70/18 |
| 6,715,449 B1 * | 4/2004 | Jordan | 119/863 |
| 6,772,929 B1 | 8/2004 | Stein | |
| 7,032,415 B2 * | 4/2006 | Young | 70/18 |
| 7,121,122 B2 * | 10/2006 | Levi | 70/18 |
| 7,322,780 B2 | 1/2008 | Hill | |
| 7,424,813 B2 * | 9/2008 | Wu | 70/58 |
| 7,454,932 B2 * | 11/2008 | Hollier | 70/18 |
| 2007/0068200 A1 * | 3/2007 | Roloff et al. | 70/30 |
| 2007/0251279 A1 | 11/2007 | Hollier | |

* cited by examiner

*Primary Examiner* — Robert J Sandy
*Assistant Examiner* — Louis Mercado
(74) *Attorney, Agent, or Firm* — Kolisch Hartwell, P.C.

(57) ABSTRACT

A theft resistant strap and buckle assembly for securing cargo on a vehicle rack includes a strap and a buckle. The strap is reinforced to resist cutting. The buckle has a lock and pawl device that operates to prevent loosening of the strap when the buckle is locked.

24 Claims, 5 Drawing Sheets

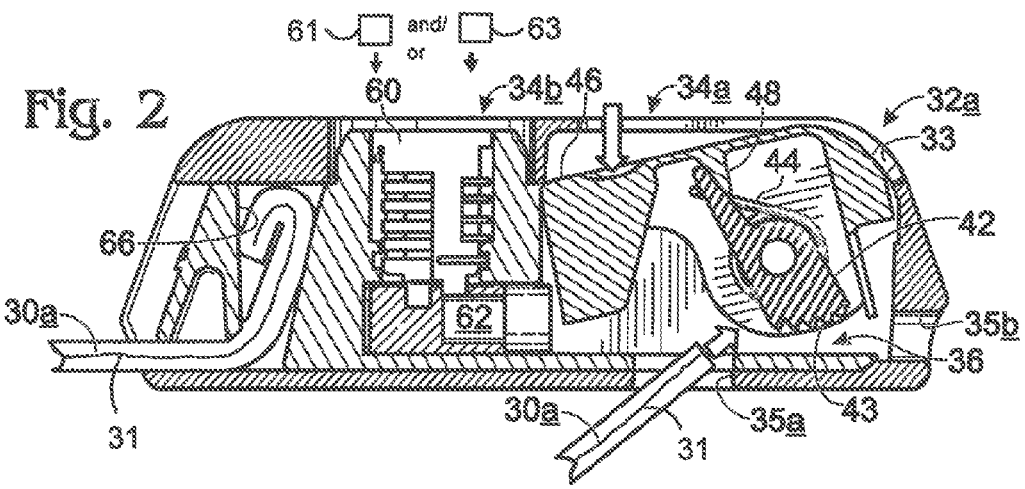
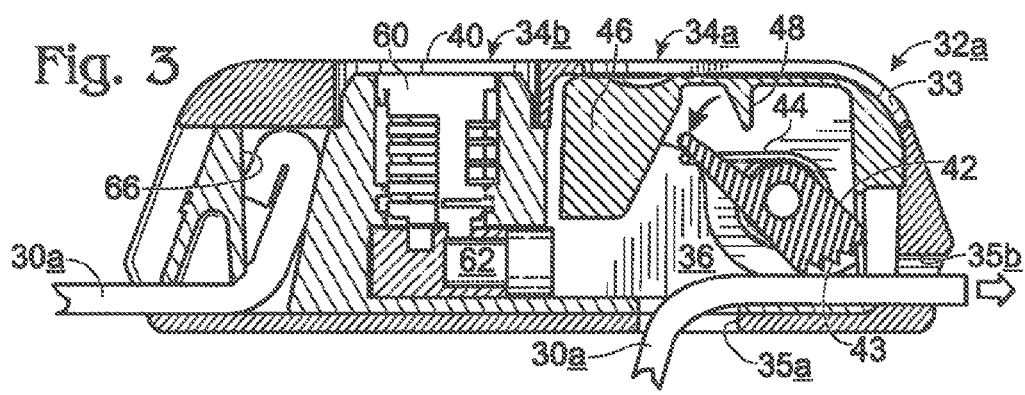
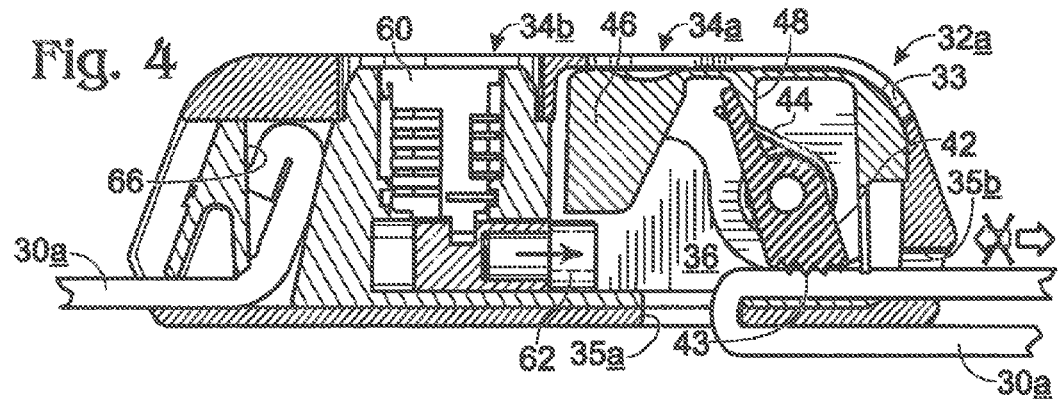
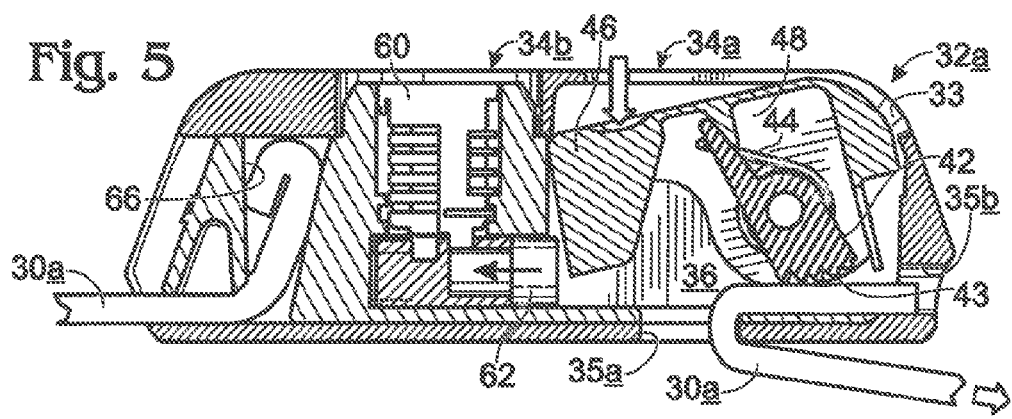

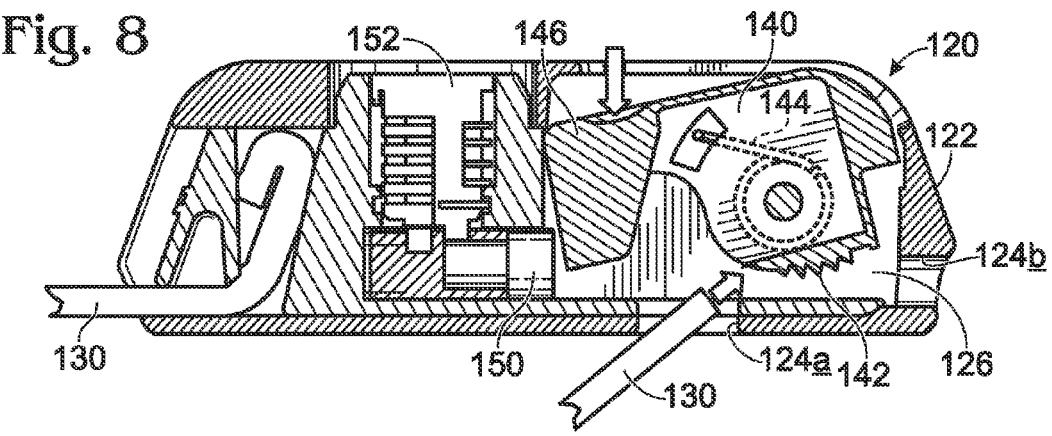
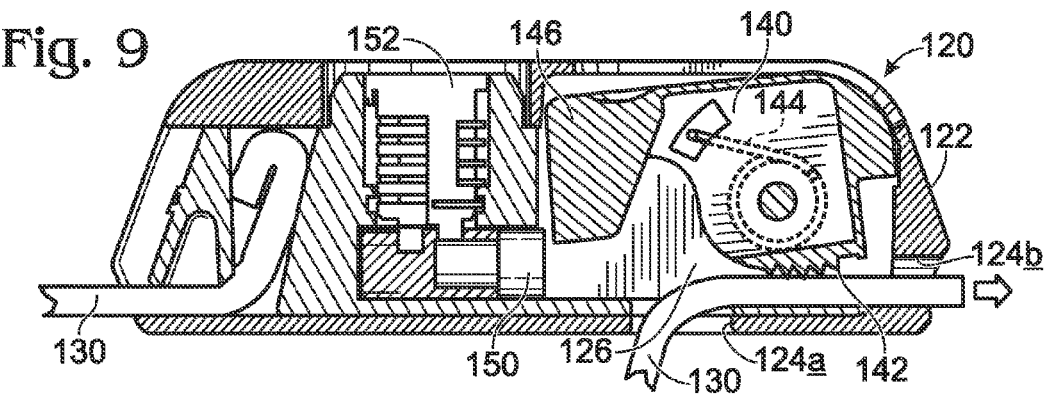
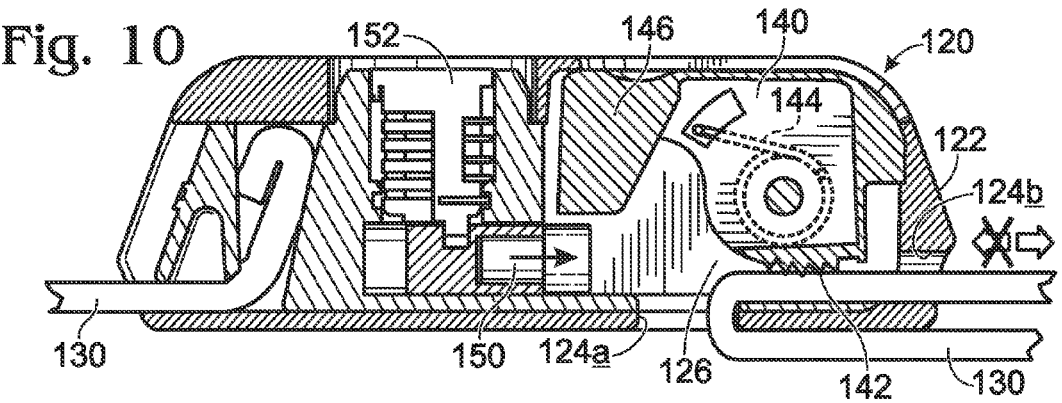
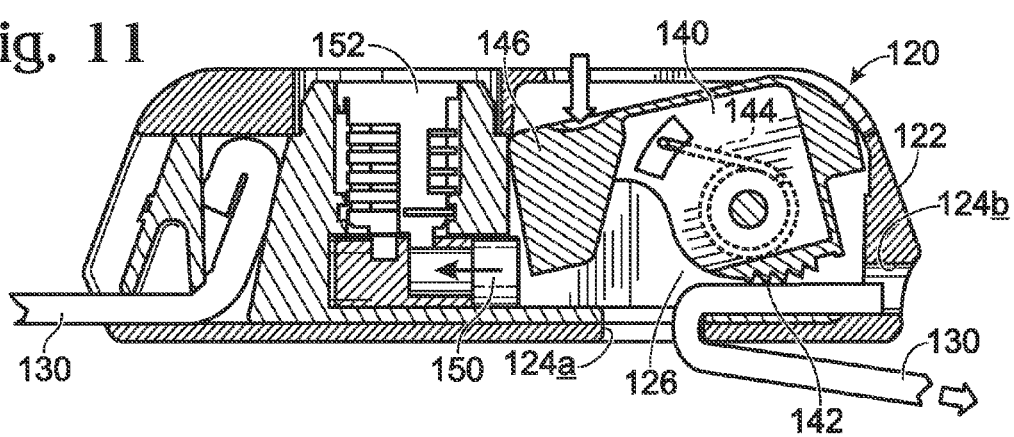

SECURITY STRAP

CROSS-REFERENCE TO RELATED APPLICATION

This application claims priority under 35 U.S.C. §119 and applicable foreign and international law of the following U.S. provisional patent application, which is hereby incorporated by reference in its entirety for all purposes: Ser. No. 61/133,441, filed Jun. 26, 2008.

FIELD

The invention relates to straps for securing cargo on a vehicle, particularly straps with a locking mechanism.

BACKGROUND

People frequently carry cargo on vehicles. Specialized racks are available for securing recreational items typically on top or on the rear of vehicles. Carrying cargo outside the vehicle is a convenient way to increase carrying capacity, particularly considering current trends to drive smaller more fuel efficient vehicles, and particularly with respect to inherently large items that usually don't fit well inside a vehicle, for example, boats, bikes, skis, and surfboards. However, a significant concern with external carrying devices is the potential for theft.

Some cargo items require straps to bind things to a rack or to an external surface of a vehicle. For example, straps are typically used to secure boats and surfboards on top of vehicles. Straps are also commonly used to secure baggage to external racks. Unfortunately, straps may be easily cut or loosened sufficiently for a thief to quickly remove cargo from the vehicle. There is a need for strapping devices that are more secure from theft, and easy to use.

SUMMARY

A strapping device for securing cargo on a vehicle includes a reinforced strap and a buckle having a lock to prevent unauthorized de-tensioning of the strap device.

BRIEF DESCRIPTION OF THE DRAWINGS

FIGS. 2-5 are a series of cross sectional views of a buckle used to secure a strap for carrying cargo on a vehicle rack.

FIGS. 8-11 are a series of cross sectional views of another embodiment of a buckle used to secure a strap around cargo on a vehicle rack.

DETAILED DESCRIPTION

This disclosure provides numerous selected examples of invented devices for carrying cargo on or with a vehicle. Many alternatives and modifications which may or may not be expressly mentioned are enabled, implied, currently possessed, and supported by the disclosure.

Figure 1:
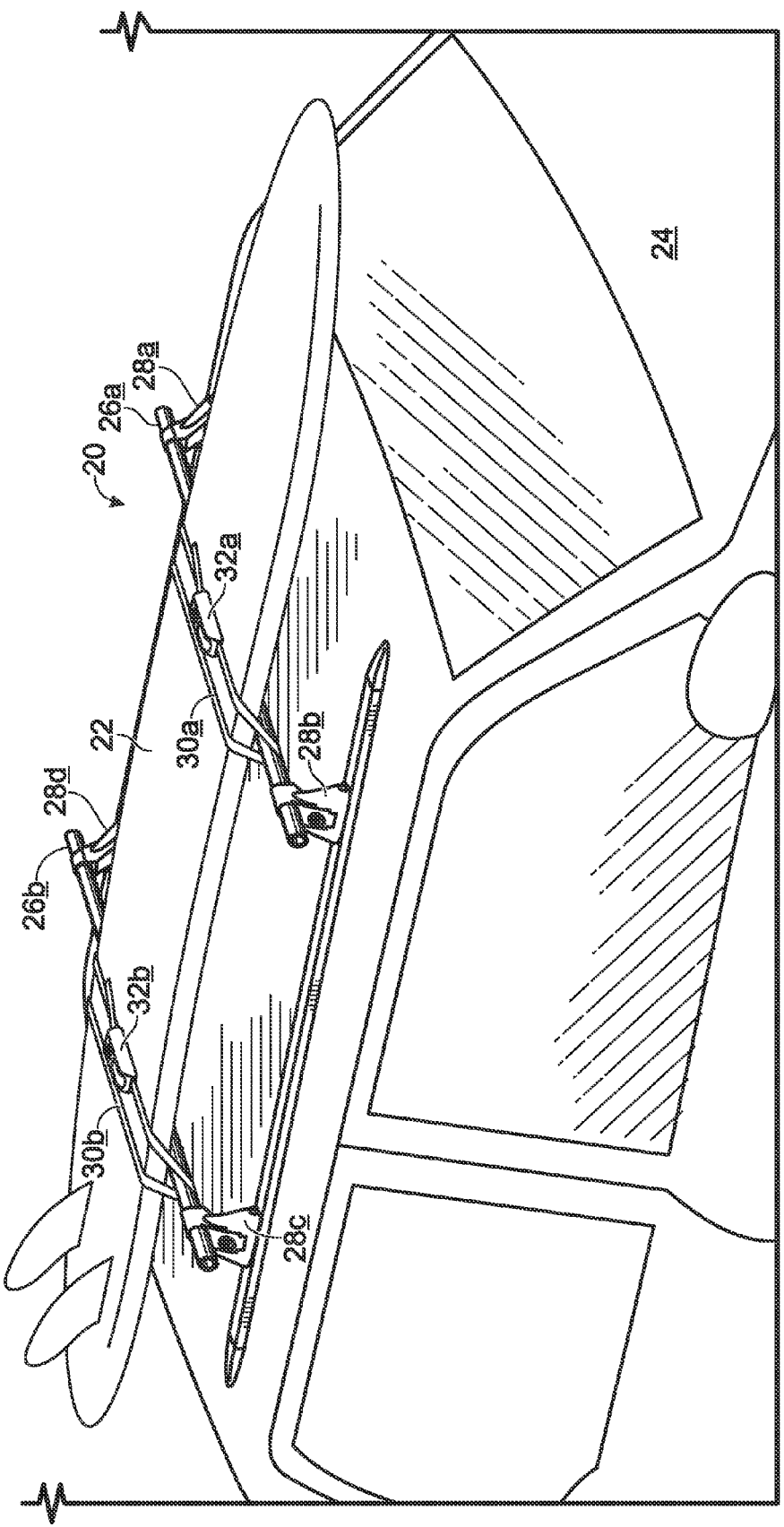
FIG. 1 is a perspective view of a rack for carrying cargo on top of a vehicle, including straps for binding a surf board onto a pair of crossbars.

FIG. 1 shows rack 20 for carrying cargo, specifically, a surf board, on vehicle 24. Rack 20 includes a pair of crossbars 26a, 26b, secured to vehicle 24 via towers 28a-d. Straps 30a, 30b are used to bind surfboard 22 onto crossbars 26a 26b. Buckles 32a, 32b, are used to tension, tighten and secure belts 30a, 30b, respectively.

As shown in FIG. 2, buckle 32a includes housing 33. Housing 33 has a top wall, a bottom wall, a first end, and a second end. Housing 33 generally has a pair of adjacent chambers 34a, 34b. Chamber 34a provides openings 35a, 35b for threading a first end portion of strap 30a through passage 36 of housing 33. Opening or second slot 35a is disposed in the second end of housing 33 and opening or third slot 35b is disposed in the bottom wall of housing 33. A second end portion of strap 30a exits housing 33 through a first opening or slot disposed in the first end. Pawl 42 has teeth 43 for gripping strap 30a. Pawl 42 is biased in a clockwise direction by spring 44. Button, switch, or toggle 46 is movable between first and second positions. Protrusion 48 engages pawl 42, and urges pawl 42 to rotate in a counterclockwise direction as button 46 is pressed downward, as shown in FIG. 2.

In second chamber 34b of housing 33, lock 60 is provided. Lock 60 may be operated between locked and unlocked positions by using an appropriate key 61, combination 63, or any other method or device which allows a user to control access to the buckle mechanism. Follower, or block 62, is linked or coupled to lock 60 in such a manner so that movement of lock 60 to the unlocked position causes follower 62 to move substantially away or out of chamber 34a, and the path of button 46, as it moves into the second position. In a preferred design, a keyed lock core interacts with the sliding block or follower (pillar). There may be a small eccentric boss on the bottom of the lock core that engages a slot in the sliding block. Alternatively, a cam and follower mechanism may also be used similarly. Follower 62 may also be biased, for example, by a spring, in one direction or another, or may be passive. Another chamber 66 is suitably provided for fixing, securely holding, the other end portion of strap 30a.

Strap 30a is suitably constructed of materials for the purpose of resisting cutting. For example, strap 30a may be comprised of one or more continuous cut-resistant strands 31. For example, nylon, PP or polyester webbing with inserted wired rope (single rope or multiple ropes) may be used for strap 30a. Alternatively, nylon, PP or polyester webbing with inserted flat woven steel webbing, may also be used. Overmolded steel cords or belts, like a tire or some timing belts (single cord or multiple cords) may also be used.

FIG. 2 shows an end portion of strap 30a being threaded through passage 36 of buckle 32a. It may be helpful for threading purposes to press button 46, thereby rotating pawl 42 counterclockwise slightly to begin the threading process.

FIG. 3 shows strap 30a being pulled through passage 36 in the process of tightening the strap around cargo and a supporting rack assembly. Friction between strap 30a and teeth 43 of pawl 42 causes pawl 42 to rotate slightly counterclockwise, thereby permitting further tightening of strap 30a.

FIG. 4 shows buckle 32a in a tightened, secure position with respect to strap 30a. Strap 30a is prevented from sliding through passage 36 in a loosening direction, by teeth 43 of pawl 42. The orientation of pawl 42 allows further tightening, as shown in FIG. 3, but does not allow the effective length (length of the strap from one end of the buckle to the other end of the buckle) of the strap to be lengthened or loosened.

FIG. 5 shows buckle 32a with lock 60 in the unlocked position. Accordingly, follower 62 is retracted substantially out of chamber 34a, out of the path of button 46, thereby permitting button 46 to be pressed to the second position (FIG. 2) for strap loosening purposes. In contrast, FIG. 4 shows lock 60 in the locked position in which follower 62 has moved into chamber 34a, blocking button 46 from moving to the second position. Accordingly, the configuration shown in FIG. 4 allows strap 30a to be tightened, but not loosened, thereby preventing an unauthorized person, i.e., a person without a key to the lock, from loosening or removing the strap.

In FIG. 5, lock 60 has been rotated to an unlocked position, thus causing follower 62 to retract out of chamber 34a, out of the path of button 46, thus permitting movement of button 46 into the second position and allowing loosening and/or removal of strap 30a from a cargo carrying load and/or rack.

Figure 6:
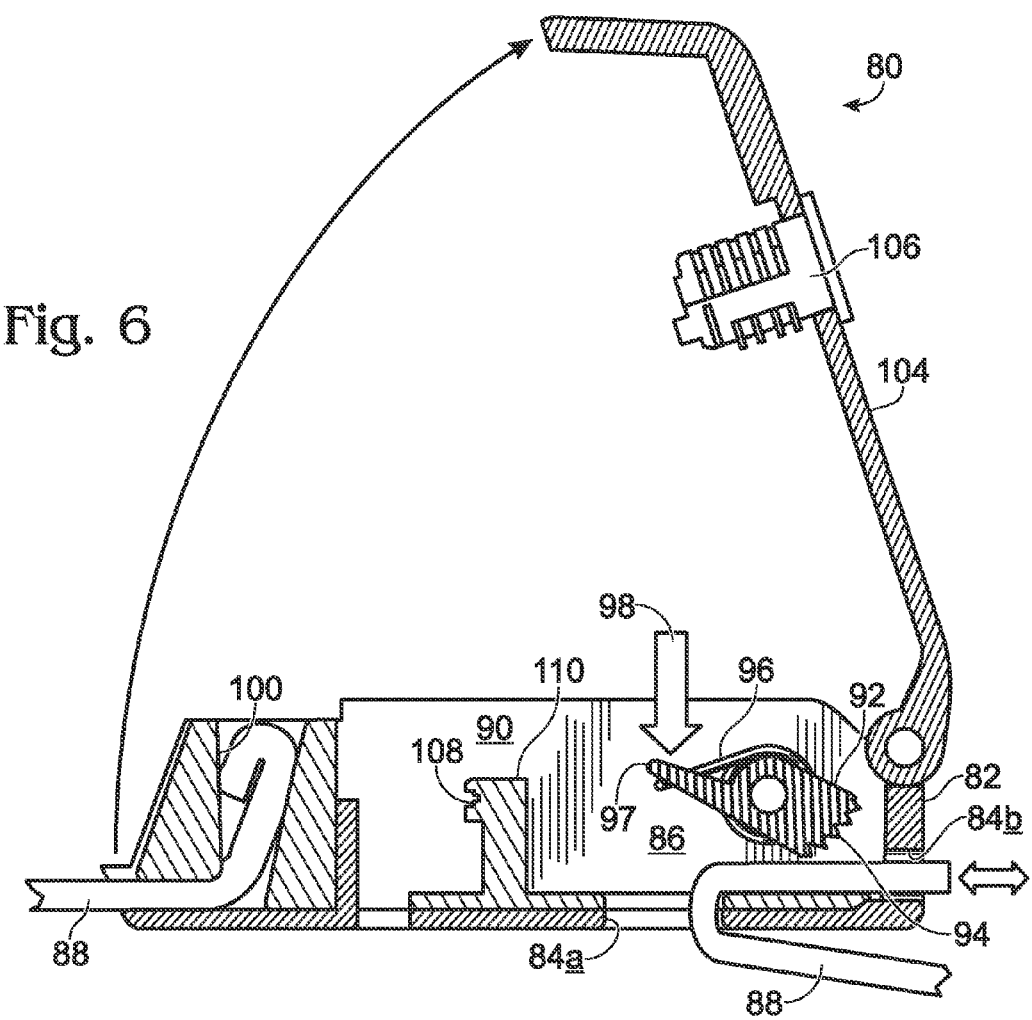
FIGS. 6 & 7 are a series of cross sectional views of an alternative buckle design for securing a strap around cargo on a vehicle.
Figure 7:
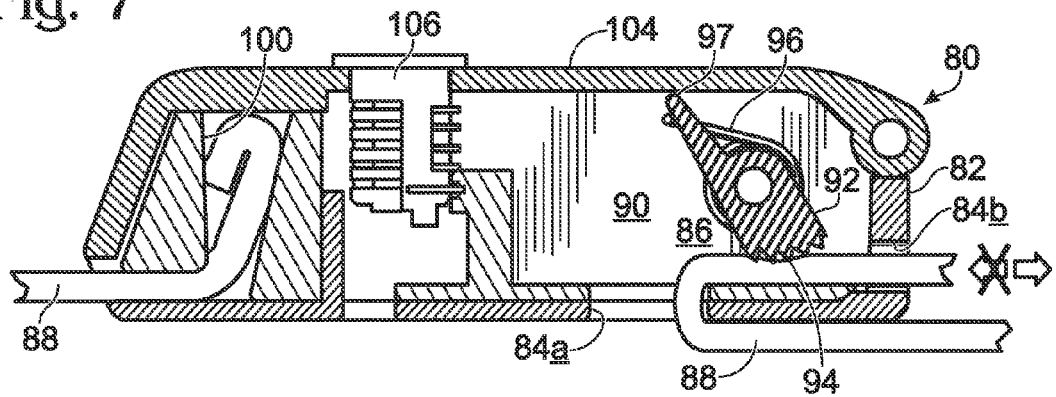

FIGS. 6 and 7 show an alternative buckle design which in many respects functions similarly to the buckle shown in FIGS. 2-5. As shown, buckle 80 includes housing 82. Openings 84a and 84b define passage 86 for threading an end portion of strap 88 through housing 82.

Chamber 90 of housing 82 contains pivoting pawl 92. Pawl 92 has teeth 94 for engaging strap 88 similar to the embodiment described with respect to FIGS. 2-5. Spring 96 biases pawl 92 to rotate in a clockwise direction, toward engagement between pawl 92 and strap 88. Loosening of strap 88 is not allowed without physically pressing end portion 97 of pawl 92 downward in the direction of arrow 98. The other end of housing 82 has a suitable structure 100 for retaining the other end portion of strap 88 in a fixed position.

Cover 104 is pivotally connected to housing 82. As shown in FIG. 7, when cover 104 is closed, access to end portion of pawl 96 is blocked. Therefore, strap 88 may not be loosened or removed while cover 104 is closed. Further, cover 104 has lock assembly 106 which is movable between locked and unlocked positions. As shown in FIG. 7, lock 106 engages groove 108 of post 110, thus preventing cover or lid 104 from being opened; preventing pawl 92 from being manipulated from rotating counterclockwise; thus preventing strap 88 from being loosened or removed from a cargo carrier.

FIGS. 8-11 show a series of cross-sectional views through an alternative buckle embodiment. In most respects, except as pointed out below, buckle 120 is similar to buckle 32a, as shown in FIGS. 2-5. In particular, the lock and follower mechanism of buckle 120 is the same as shown and previously described for buckle 32a. Therefore, this mechanism will not be described again.

Buckle 120 includes housing 122 containing the strap tensioning, controlling, and locking devices. Openings 124a, 124b define passage 126 for threading an end portion of strap 130 through housing 122. In contrast to buckle 32a, buckle 120 has an integrated pawl/button member 140. Teeth 142 are provided for engaging strap 130. Spring 144 biases pawl 140 in a clockwise direction. Button portion of 146 may be pressed downward, as show in FIG. 8, to create space in passage 126 for threading strap 130.

FIG. 9 shows teeth 142 of pawl 140 engaging strap 130. Strap 130 is moving as shown by the arrow, in a tightening process. Friction between strap 130 and teeth 142 of pawl 140 cause slight counterclockwise rotation of pawl 140 permitting strap 130 to continue tightening.

In FIGS. 8 and 9, pawl 150 is retracted leaving space for button portion 146 to rotate downward for purposes of loosening strap 130.

FIG. 10 shows lock 152 in a locked position. Accordingly, follower 150 has moved into an extended position blocking button portion 146 from moving downward. It may be desirable to leave sufficient space between follower 150 and button portion 146 so that strap 130 may continue to move in a tightening direction while the buckle is locked, but may not be loosened or removed.

Finally, FIG. 11 shows buckle 120 in which lock 152 has been rotated to its unlocked position, causing follower 150 to be retracted. Button portion 146 is pressed downward causing rotation of pawl 140 in a counterclockwise direction causing disengagement of teeth 142 from strap 130, allowing loosening and/or removal of strap 130 from a cargo carrier.

Figure 12:
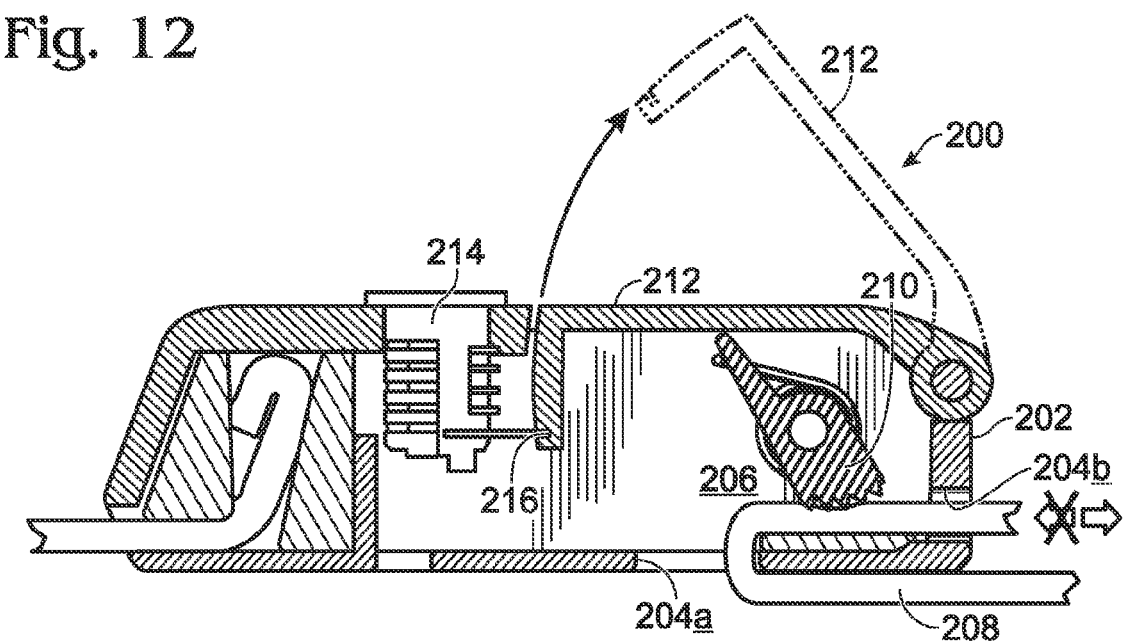
FIG. 12 is a cross-sectional view of another embodiment.

FIG. 12 shows a modification of buckle 80 as previously described and shown in FIGS. 6 and 7. Buckle 200 includes housing 202 with openings 204a, 204b defining passage 206 through housing 202. Belt 208 is threaded through passage 206 in housing 202. Pawl 210 is spring-biased and operates similar to the one described in buckle 80 in FIGS. 6 and 7.

In contrast to buckle 80, buckle 200 has cover or lid 212 which does not carry a lock. Lock 214 remains with the main body of housing 202. Lock 214 is movable between locked and unlocked positions. In FIG. 12, lock 214 is movable between locked and unlocked positions. In FIG. 12, lock 214 is in its locked position in which it engages groove 216 in lid 212, thereby preventing opening of lid 212, and access to pawl 210.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

I claim:

1. A binding device for securing cargo on a rack comprising
a strap having continuous cut-resistant strands running between first and second end portions,
a buckle including a housing having a fixed connection to the first end portion of the strap, and a passage for sliding the second end portion of the strap through the housing,
a spring biased pawl, in the housing, having a frictional surface configured to engage the strap as it passes through the passage, the pawl being biased against the strap in an orientation that allows tightening of the strap and prevents loosening of the strap,
a control button being biased in a first position and pressable through a path to a second position, wherein pressing of the control button to the second position causes the pawl to disengage the strap, allowing the strap to be loosened,
a lock connected to the housing, the lock being operable between locked and unlocked positions, and
a follower coupled to the lock, the follower being completely out of the path of the control button when the lock is in the unlocked position, and blocking movement of the control button when the lock is in the locked position, wherein the strap is movable in a tightening direction but not in a loosening direction when the follower is blocking movement of the control button and the lock is in the locked position.

2. The binding device of claim 1, wherein the control button is on the pawl.

3. The binding device of claim 1, wherein the control button urges the pawl to disengage the strap when the control button is pressed.

4. The binding device of claim 1, wherein the pawl and control button are in a first chamber of the housing, the lock being contained in a second chamber of the housing connected to the first chamber by a passage disposed at a bottom of the first and second chambers, the follower being moveable in the passage between the first chamber and the second chamber.

5. The binding device of claim 1, wherein the frictional surface of the pawl has teeth structures for gripping the strap.

6. The binding device of claim 5, wherein the teeth structures each have a pointed tip that grips to the strap.

7. The binding device of claim 1, wherein the follower is eccentrically connected to the lock.

8. The binding device of claim 1, wherein the lock requires a key for rotation to the unlocked position.

9. The binding device of claim 1, wherein the lock requires entry of a combination code for rotation to the unlocked position.

10. A binding device for securing cargo on a rack comprising:
a strap having continuous cut-resistant strands running between first and second end portions,
a buckle including a housing having a first end, a second end, a top wall, and a bottom wall, the first end of the housing having a first slot, the second end of the housing having a second slot, the bottom wall having a third slot, the first end portion of the strap passing through the first slot and fixed to the buckle, the second end portion of the strap passing through the third slot into the housing and exiting through the second slot,
a spring biased pawl in the housing, having a frictional surface configured to engage a portion of the strap located in the housing between the second and third slots, the pawl being biased against the strap in an orientation that allows movement of the strap from the third slot toward the second slot but not in the reverse direction,
a control button being biased in a first position and pressable through a path to a second position, wherein pressing of the control button to the second position causes the pawl to disengage the strap, allowing the strap to be loosened, and
a lock connected to the housing, the lock being operable between locked and unlocked positions to move a follower into a blocking position located in the path of the control button physically to block the control button from moving to the second position,
wherein the follower is disposed directly beneath the control button when the follower is in the blocking position and the lock is in the locked position.

11. The binding device of claim 10, wherein the control button and the lock are accessible on the top wall of the housing.

12. The binding device of claim 10, wherein at least a portion of a length of the strap is substantially parallel to the top and bottom walls of the housing.

13. The binding device of claim 10, wherein the follower is completely out of the path of the control button when the lock is in the unlocked position.

14. The binding device of claim 10, wherein the strap is movable from the third slot toward the second slot when the follower is in the blocking position.

15. The binding device of claim 10, wherein the first end of the strap is fixed to the buckle inside the housing.

16. The binding device of claim 10, wherein the control button is disengaged from the pawl when the lock is in the locked position.

17. The binding device of claim 10, wherein the follower is proximate the bottom wall and movable horizontally, relative to the bottom wall, from an unblocking position completely outside the path of the control button to the blocking position.

18. A binding device for securing cargo on a rack comprising:
a strap having first and second portions,
a buckle including a housing with a first opening through which the first portion of the strap extends and a second opening through which the second portion of the strap extends,
a pawl in the housing configured to engage the strap and being biased against the strap in an orientation that allows movement of the strap in a tightening direction but not in a loosening direction,
a control button being biased in a first position and movable through a path to a second position, wherein moving the control button to the second position causes the pawl to disengage the strap, allowing the strap to be moved in the loosening direction,
a lock connected to the housing, the lock being operable between locked and unlocked positions, and
a follower coupled to the lock, the follower being completely out of the path of the control button when the lock is in the unlocked position and movable into the path to block movement of the control button when the lock is in the locked position,
wherein the strap is movable in the tightening direction but not in the loosening direction when the follower is blocking movement of the control button and the lock is in the locked position.

19. The binding device of claim 18, wherein the control button is completely disengaged from the pawl when the lock is in the locked position.

20. The binding device of claim 18, wherein the lock has a key slot accessible through a top wall of the housing and a cylinder disposed within a first chamber of the housing separate from a second chamber of the housing in which the control button and the pawl are disposed, the first and second chambers being connected by a passage disposed adjacent a bottom wall of the housing.

21. The binding device of claim 20, wherein the follower is connected to the cylinder of the lock and is operable to move in the passage from the first chamber to the second chamber into the locked position of the lock.

22. The binding device of claim 21, wherein the follower is disposed directly beneath the control button when the lock is in the locked position.

23. The binding device of claim 18, wherein the housing includes a first end, a second end, a top wall, and a bottom wall, the first end having the first opening, the second end having the second opening, the bottom wall having a third opening, the second portion of the strap extending through the second and third openings.

24. The binding device of claim 23, wherein the strap is moved in the tightening direction when being moved in a direction from the third opening toward the second opening and is moved in the loosening direction when being moved in a reverse direction.

* * * * *